(12) United States Patent
Sathe (10) Patent No.: US 7,386,763 B2
(45) Date of Patent: Jun. 10, 2008

(54) PROACTIVE SYSTEMIC SCHEDULER FOR RESOURCE LIMITED TEST SYSTEMS

(75) Inventor: Abhay Sathe, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 656 days.

(21) Appl. No.: 10/885,308

(22) Filed: Jul. 7, 2004

(65) Prior Publication Data

US 2006/0010448 A1    Jan. 12, 2006

(51) Int. Cl.
*G06F 11/00* (2006.01)
(52) U.S. Cl. .......................... 714/43; 714/25; 714/32; 714/33
(58) Field of Classification Search ............ 714/23, 714/32, 33, 43; 709/229; 702/109, 122; 700/99, 100
See application file for complete search history.

(56) References Cited

U.S. PATENT DOCUMENTS

| 5,848,403 | A |   | 12/1998 | Gabriner et al. |       |
|-----------|---|---|---------|-----------------|-------|
| 5,943,652 | A | * | 8/1999  | Sisley et al.   | 705/9 |
| 6,131,093 | A |   | 10/2000 | Maruyama et al. |       |
| 6,397,359 | B1| * | 5/2002  | Chandra et al.  | 714/712 |
| 6,578,005 | B1| * | 6/2003  | Lesaint et al.  | 705/8 |
| 6,920,585 | B1| * | 7/2005  | Fintel et al.   | 714/43 |
| 2004/0093180 | A1 | * | 5/2004 | Grey et al.    | 702/123 |

OTHER PUBLICATIONS

"Proceedings of IEEE International Conference on Evolutionary Computation," published 1996, IEEE, pp. 547-552, Isao Ono, et al. "A Genetic Algorithm For Job-Shop Scheduling Problems Using Job-Based Order Crossover." See especially pp. 547-549.
Search Report from the UK Patent Office issued Jul. 25, 2005.

* cited by examiner

*Primary Examiner*—Robert Beausoliel
*Assistant Examiner*—Joseph D Manoskey (57) ABSTRACT

An apparatus having a proactive systemic scheduler connected with a network testing system. The scheduler receives a list of tests to be run on the network test system during a testing interval, as well as available test baseline information for the tests to be run. Using a predetermined algorithm, the list of the tests, and the available test baseline information, the scheduler automatically creates a plurality of testing schedules, such that a given test object cannot be simultaneously allocated to more than one test. Each of the plurality of schedules indicates test object allocation for the testing interval. Next, the scheduler selects one of the plurality of testing schedules based on reducing an overlap of test object allocation for the testing interval. The scheduler then communicates the selected testing schedule to be implemented by the network test system.

34 Claims, 5 Drawing Sheets

21

| Tests | Devices | Duration |
|-------|---------|----------|
| T1    | D1      | 21       |
| T2    | D2, D3  | 6        |
| T3    | D1, D3  | 8        |
| T4    | D2      | 16       |
| T5    | D3      | 11       |

FIG. 1

| Tests | Devices | Duration |
|---|---|---|
| T1 | D1 | 21 |
| T2 | D2, D3 | 6 |
| T3 | D1, D3 | 8 |
| T4 | D2 | 16 |
| T5 | D3 | 11 |

PROACTIVE SYSTEMIC SCHEDULER FOR RESOURCE LIMITED TEST SYSTEMS

BACKGROUND OF THE INVENTION

1. Field of the Invention

The present invention relates to a method and an apparatus to optimize resource usage in a scheduled testing system, and more particularly, to a method and an apparatus to optimize resource usage in a scheduled software testing system that is required to use limited physical resources.

2. Description of the Related Art

A scheduled software testing system is one in which software tests are run repeatedly on regular intervals. Over time, for example, a week, or a month, tests may be added or deleted. But generally, from one test interval to another, the tests that are run during the interval do not change. Examples of such scheduled software testing systems include wireless network end-to-end testers, and dialup internet service testers.

In a single interval (single run cycle time), the behavior of a scheduled test system can be described by a general class of mathematical problems known as Job Shop Scheduling Problems (JSSPs). This class of problems deals with optimizing machine use in a job shop. In the mathematical analogy, a job shop contains a set of specialized machines that each complete part of a job. Each type of job entering the shop is required to go through a series of operations unique to the type of job. In other words, each type of job requires use of a subset of the specialized machines to complete the job. The problem of creating an optimized schedule for all jobs entering the shop is called the Job Shop Scheduling Problem (JSSP).

Genetic algorithms (GA), also called 'Evolutionary Algorithms' (EA), are a class of mathematical algorithms that are popularly used to approximate optimized solutions to JSSPs. Genetic algorithms use principles of 'genetic evolution', by first creating a relatively small (typically hundreds) number of schedules, purely randomly. Next, the best schedules from this 'population' are given a chance to 'recombine' to create the next 'generation' of schedules. Every 'generation' of schedules also undergoes random 'mutation' to create new 'features' not available in the current generation. If this process of selection, recombination, and mutation is repeated a sufficient number of times, for example, thousands of times, taking care to 'breed' the best schedules, the overall population will 'evolve' towards better schedules.

In a conventional scheduled software testing system for a wireless network, a diagnostic measurement system submits a list of tests to be run during a testing interval to a test controller. For each submitted test, the test controller uses a scheduler to decide a time at which each test is to be started. The scheduler decides the time to start each test by using historical data of the amount of time each test required in previous testing intervals. Put differently, the more time a given test requires to complete, the more likely that the given test will be started early in the testing interval.

When a given test is scheduled to start, the test controller requests test resources (test objects) needed to run the given test from a resource manager. If the resources needed to run the given test are being used by some other test, the given test has to wait. When the resources become available, the test is allowed to start running on the test objects. The test objects are special purpose computers where the actual physical resources needed to run the test are located. A particular test object may have multiple resources, which may be required for different parts of a given test. Once a test is completed, test results are reported back from the test object to the test controller, which relays the test results back to the diagnostic management system (DMS).

The diagnostic management system is connected with a data store that stores results of previously run tests. Portions of this data are used by the diagnostic measurement system to create a baseline, or a prediction of the time each test is likely to take to complete, depending on a pattern each test has followed historically. The DMS uses the time taken by each test to create or improve the baseline data for each test.

The scheduler has a local memory, and stores the time taken by each test (elapsed test time) in the local memory. The elapsed test time includes any time the test may have spent waiting for the test resources. The scheduler uses this data when determining test start times for future testing intervals.

In this conventional scheduled software testing system for a wireless network, when the resource manager grants test resources for the test controller to run a given test, the resource manager secures all resources necessary for the given test, so that the given test can be completed without having to wait. Thus, the scheduled software testing system is required to use limited physical resources. In other words, even if the given test only uses a particular resource at the very beginning of the given test, that particular resource is secured by the resource manager until the given test is completed. In short, simultaneous test runs are not possible if the tests use the same resource.

To analogize this situation for the JSSP, two different jobs may both require use of a particular specialized machine, but only one job at a time can use the particular specialized machine. Additionally, once a job is started, all specialized machines required to complete that job are occupied until the job is complete. Thus, even if a first job is finished using one of the specialized machines, that specialized machine is not free for use by another job until the first job is complete.

In such a conventional scheduled software testing system, problems can arise. For example, when a scheduler only uses historical length of completion to determine test start times during a testing interval, length of completion for a given test will be skewed if the given test has to wait for a required test object to become available. In such a case, starting the test earlier in the testing interval will not yield a more efficient test schedule unless the required test object (resource) is available.

For example, assume both Test A and Test B require test object A, Test A is started at Time 1, and Test B is started at Time 2, which is prior to completion of Test A. Over several testing intervals, to improve the efficiency of the test schedule, the conventional scheduler will progressively move the start time of Test B closer to Time 1. The flaw in such a system is apparent: even if Test B is started immediately after Test A, Test B will not be able to run until Test A is finished, and Test B's length of completion will continue to increase. Even if the Test B were started prior to test A, while Test B's length of completion may improve, Test A's length of completion would increase.

Such problems increase as the number of tests and test devices increase. Additionally, as the number of tests and resources in each schedule increases, the number of possible schedules increases rapidly, and for test systems with limited physical resources, there is no available mathematical formula to simply calculate the best schedule from an initial list of tests. Further, since a typical wireless test system contains hundreds of devices and thousands of tests that use one or more devices at any given time, it would not be feasible, given the limitations in computer speed and memory, to go through all the possible schedules to decide on the best schedule within a reasonable time.

The conventional scheduled software testing system attempts to provide individual test schedules which does not account for the effect of limited test resources on tests sharing the resources. Additionally, the conventional scheduled software testing system does not provide an easy metric for device usage or the amount of improvement between schedules.

Further, the conventional scheduled software testing system is reactive. That is, no prior warning of potential conflicts of device usage is available. Wireless test systems are prone to expected, periodic overloads. While the baseline data provides a way to predict if system overload occurs at regular intervals, there is a possibility that the system may not be designed for peak capacity, or may be designed with too much slack to avoid potential overload. This would unnecessarily increase a cost of the system.

SUMMARY OF THE INVENTION

Accordingly, it is an aspect of the present invention to provide a proactive systemic scheduler for resource limited test systems.

The foregoing and/or other aspects of the present invention are achieved by providing a method including: (a) automatically creating a plurality of schedules of tests to be run on a network test system during a testing interval, using a predetermined algorithm, a list of the tests to be run during the testing interval, and available baseline data for the tests; and (b) selecting one of the plurality of schedules based on minimizing an overlap of test object allocation for the testing interval. The schedules indicate test object allocation for the testing interval, and a given test object cannot be simultaneously allocated to more than one test.

The foregoing and/or other aspects of the present invention are also achieved by providing an apparatus including: (a) a scheduler connected with a network test system. The scheduler receives a list of tests to be run on the network test system during a testing interval, and available test baseline information for the tests to be run. Additionally, using a predetermined algorithm, the list of the tests, and the available test baseline information, the scheduler automatically creates a plurality of testing schedules that indicate test object allocation for the testing interval under a condition that a given test object cannot be simultaneously allocated to more than one test. Additionally, the scheduler selects one of the plurality of schedules based on minimizing an overlap of test object allocation for the testing interval.

The foregoing and/or other aspects of the present invention are also achieved by providing an apparatus including: (a) a network; (b) test objects connected with the network; (c) a data store storing test baseline information for tests run on the test objects; (d) a diagnostic measurement system connected with the network; (e) a test controller, connected with the network; and (f) a scheduler. At a predetermined time prior to a testing interval, the test controller receives, from the diagnostic measurement system, a list of tests to be run during the testing interval. The scheduler receives the list of tests to be run from the test controller; and requests test baseline information for the tests to be run from the diagnostic measurement system. The diagnostic measurement system coordinates with the data store to retrieve available test baseline information. The scheduler receives the available test baseline information for the tests to be run, and using a predetermined algorithm, the list of tests, and the available test baseline information, the scheduler automatically creates a plurality of testing schedules that indicate test object allocation for the testing interval under a condition that a given test object cannot be simultaneously allocated to more than one test. Then, the scheduler selects one of the plurality of schedules based on minimizing an overlap of test object allocation for the testing interval, and communicates the selected schedule to the test controller. After receiving the selected schedule, the test controller runs the tests on the test objects according to the selected schedule. And once testing is complete, the test controller reports test results to the diagnostic measurement system, and the diagnostic measurement system updates the data store with the test results.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to embodiments of the present invention, examples of which are illustrated in the accompanying drawings, wherein like reference numerals refer to the like elements throughout. The embodiments described below explain the present invention by referring to the figures.

Embodiments of this invention describe how the general class of mathematical methods called 'Genetic' or 'Evolutionary' algorithms can be used to create a noticeably improved schedule for resource limited wireless tests within a reasonable time.

Figure 1:
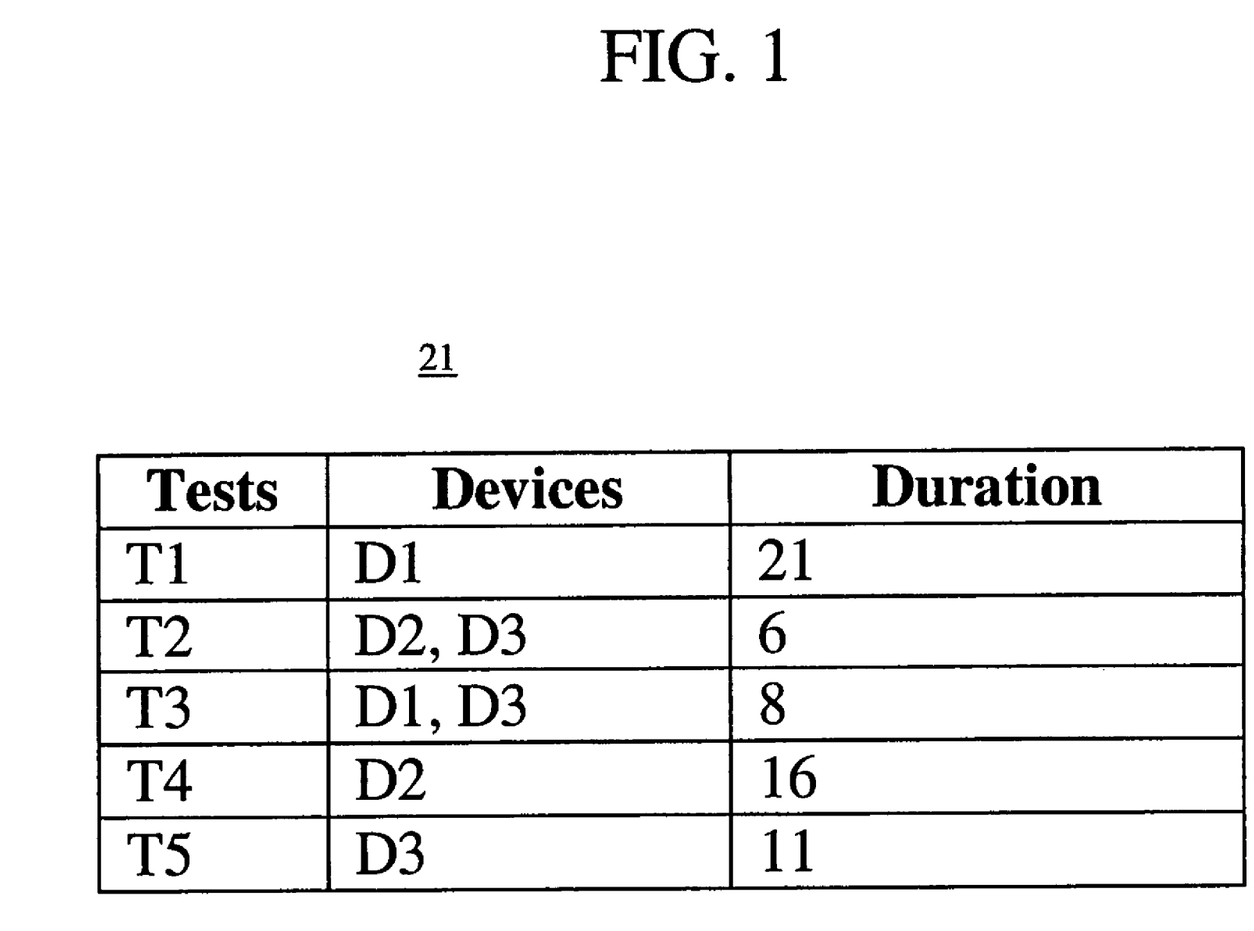
FIG. 1 is a table illustrating a resource limited test system according to an embodiment of the present invention.

FIG. 1 is a table 21 illustrating a resource limited test system according to an embodiment of the present invention. The present invention, however, is not limited to any particular type of resource limited test system. The resource limited test system shown in FIG. 1 is for illustrative purposes, and many variations are possible. FIG. 1 shows a table of five tests (software programs) T1-T5, that use three resources (devices) D1-D3, and the projected duration of each test. Some tests need more than one device, and the devices are shared amongst the tests. But a given device (resource) cannot be simultaneously allocated to more than one test. In short, a given device can only be used by one test at a time.

Figure 2:
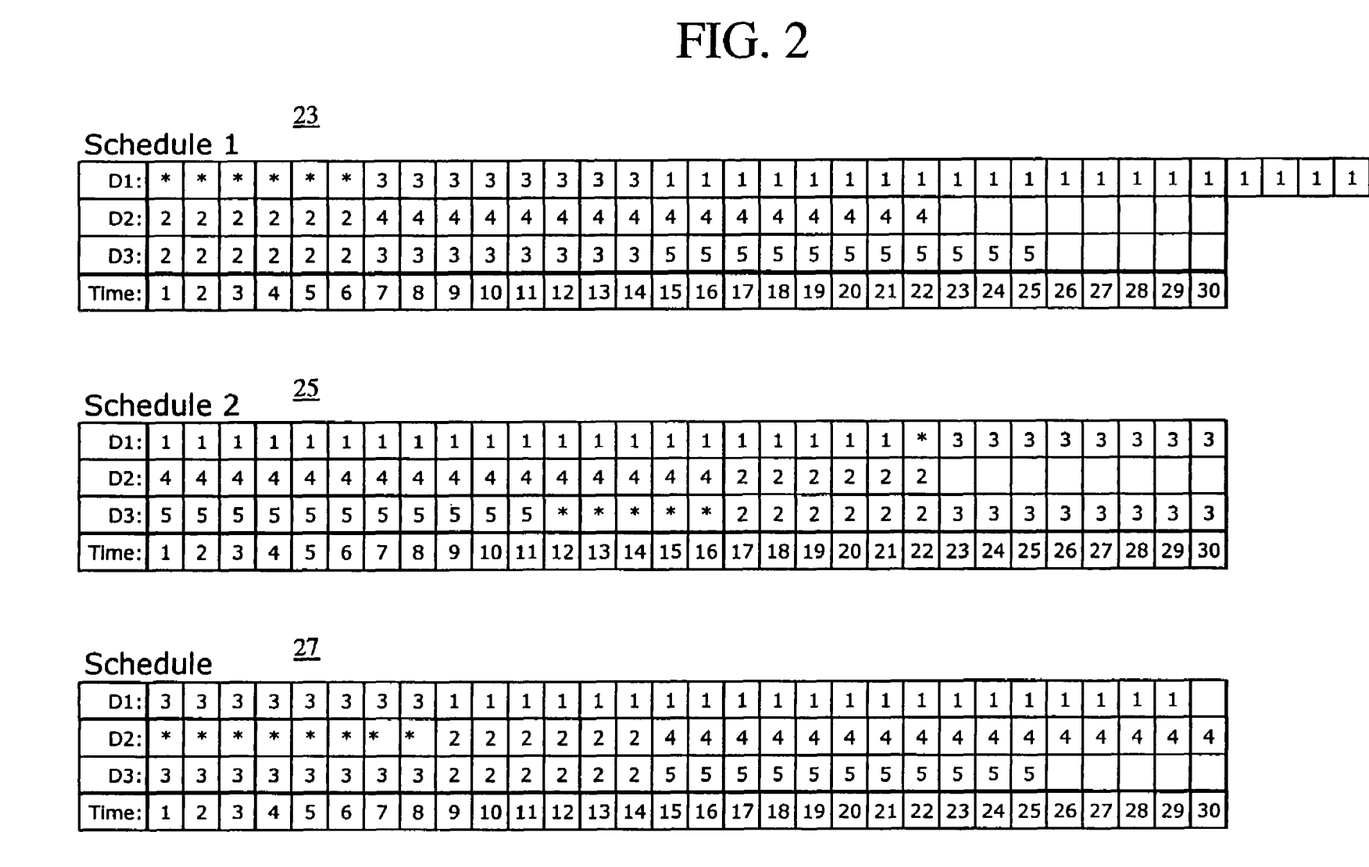
FIG. 2 illustrates three possible schedules for tests of FIG. 1.

FIG. 2 is a graphical representation of a single testing interval of three possible schedules 23, 25, and 27, for the five tests of FIG. 1. The schedules are shown as arrays of length equal to the time in the interval (e.g. minutes). Each row is represents one device (the limited resource). The length of the test interval is 30 units, for example, 30 minutes. The numbers in the array represent the test currently running (1 for T1 etc.)

A '*' in the array denotes the time for which a particular device sits idle because no test that requires it next can be run at this time (because another device needed for a test yet to be run is being used by some other test). Note that there are no '*' after all the tests that can use the device in this test interval are finished using the device. This is free time, which can be used to add more tests to the current testing interval Several things are apparent from inspection of the schedules of FIG. 2. First, some test schedules are better than others. For example, in Schedule 1, test 1 does not finish within the testing interval. Second, determining the best schedule from the available choice of schedules is not overly complicated. For example, one technique counts the number of * in each schedule and chooses the schedule with least number of *, since that schedules has the least idle time. Less idle time means more available free time (at the end of each device use), so that more tests could be inserted in the testing interval.

The resource limited test system of FIG. 1 can be modeled as a JSSP, and accordingly, a genetic algorithm can be employed to approximate an optimized schedule for the resource limited test system. The genetic algorithm typically delivers a shorthand notation for each of the schedules produced in the new generation of schedules that meet the given criteria. This shorthand notation is then converted into a workable schedules using one of many well known mathematical techniques. One example of a mathematical technique to generate a schedule for such a resource limited test system is the Giffler-Thompson algorithm.

Once the schedules are produced using, for example, the Giffler-Thompson algorithm, the schedules can then be evaluated against each other. At this point, one schedule may be selected, or the new generation of schedules may be used as a starting point to evolve another new generation of schedules, depending on time and resource constraints of the testing system.

Figure 3:
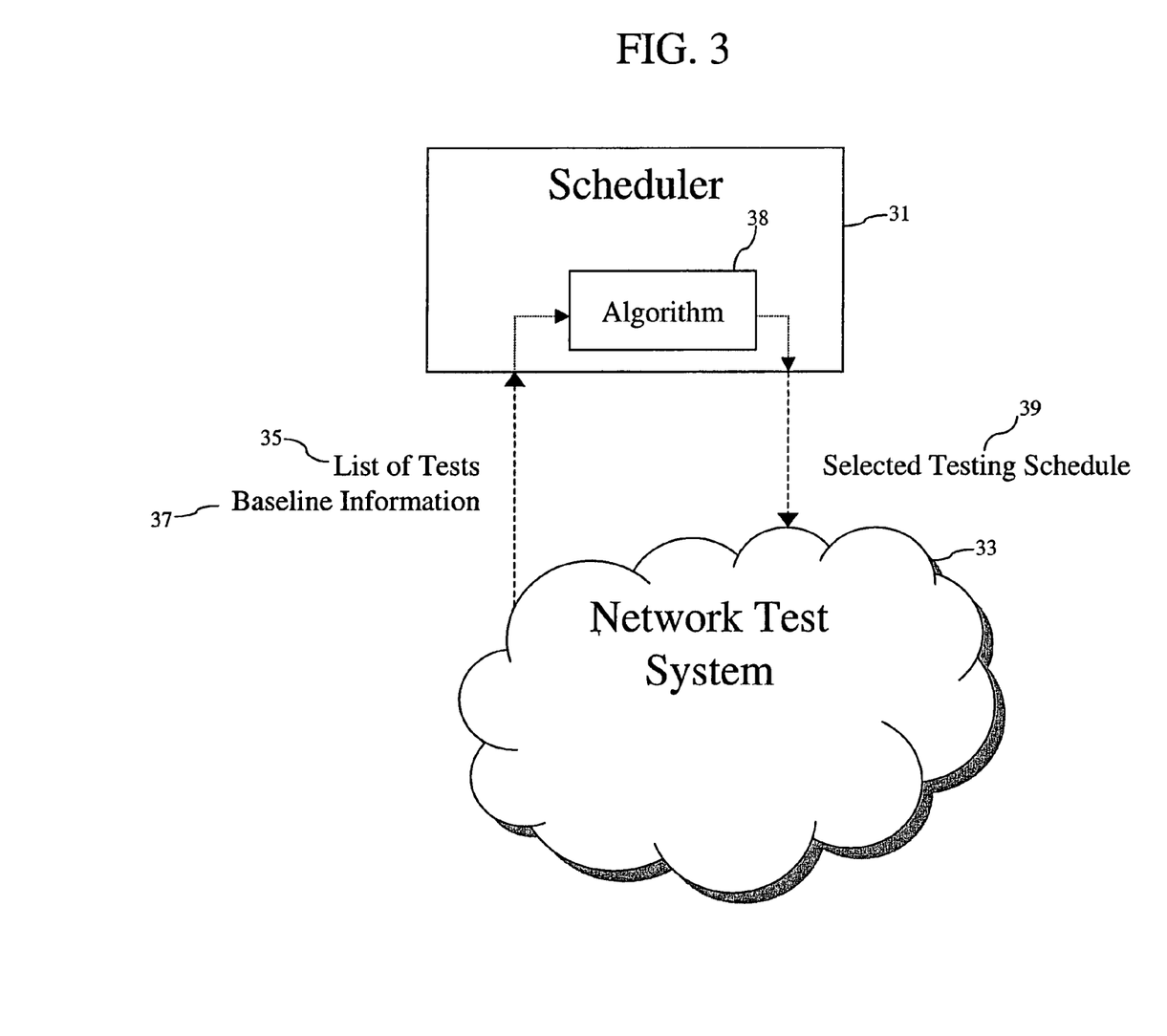
FIG. 3 illustrates an apparatus according to an embodiment of the present invention.

FIG. 3 illustrates an apparatus according to an embodiment of the present invention. In FIG. 3, a scheduler 31 is connected with a network testing system 33. The scheduler 31 receives a list of tests 35 to be run on the network test system 33 during a testing interval. The scheduler 31 also receives available test baseline information 37 for the tests to be run. Using a predetermined algorithm 38, the list of the tests 35, and the available test baseline information 37, the scheduler 31 automatically creates a plurality of testing schedules, such that a given test object cannot be simultaneously allocated to more than one test. Each of the plurality of schedules indicates test object allocation for the testing interval. The scheduler 31 is a computer, for example, a personal computer. Hereinafter, use of the word 'automatically' means without human intervention, or automated and controlled by a computer. For example, use of the predetermined algorithm 38 by the scheduler 31 to automatically create the plurality of schedules is accomplished without human intervention. Then, the scheduler 31 selects one of the plurality of testing schedules based on minimizing an overlap of test object allocation for the testing interval. The scheduler 31 then communicates the selected testing schedule 39 to be implemented by the network test system 33.

A given test object is idle if a test yet to be run requires both the given test object and another test object currently in use. According to one embodiment, minimizing the overlap of test object allocation for the testing interval includes minimizing intervals in which test objects are idle. According to another embodiment, minimizing the overlap of test object allocation for the testing interval includes maximizing usage of the test objects during the testing interval.

According to one embodiment, the test objects are elements of a wireless network. The present invention, however, is not limited to any particular type of network, and many variations are possible.

Additionally, according to one embodiment, the scheduler 31 automatically creates the plurality of testing schedules using the predetermined algorithm, the list of the tests, and the available test baseline information by employing a genetic algorithm to combine a set of schedules to create a new generation of schedules, and introduce random mutations when creating the new generation of schedules. Further, according to one embodiment, the scheduler 31 selects the one of the plurality of schedules based on reducing an overlap of test object allocation for the testing interval by employing a Giffler-Thompson algorithm in conjunction with the new generation from the genetic algorithm, to evaluate and select a schedule from the new generation, based on reducing the overlap of test object allocation for the testing interval. The present invention, however, is not limited to any particular type of algorithm, and many variations are possible.

Figure 4:
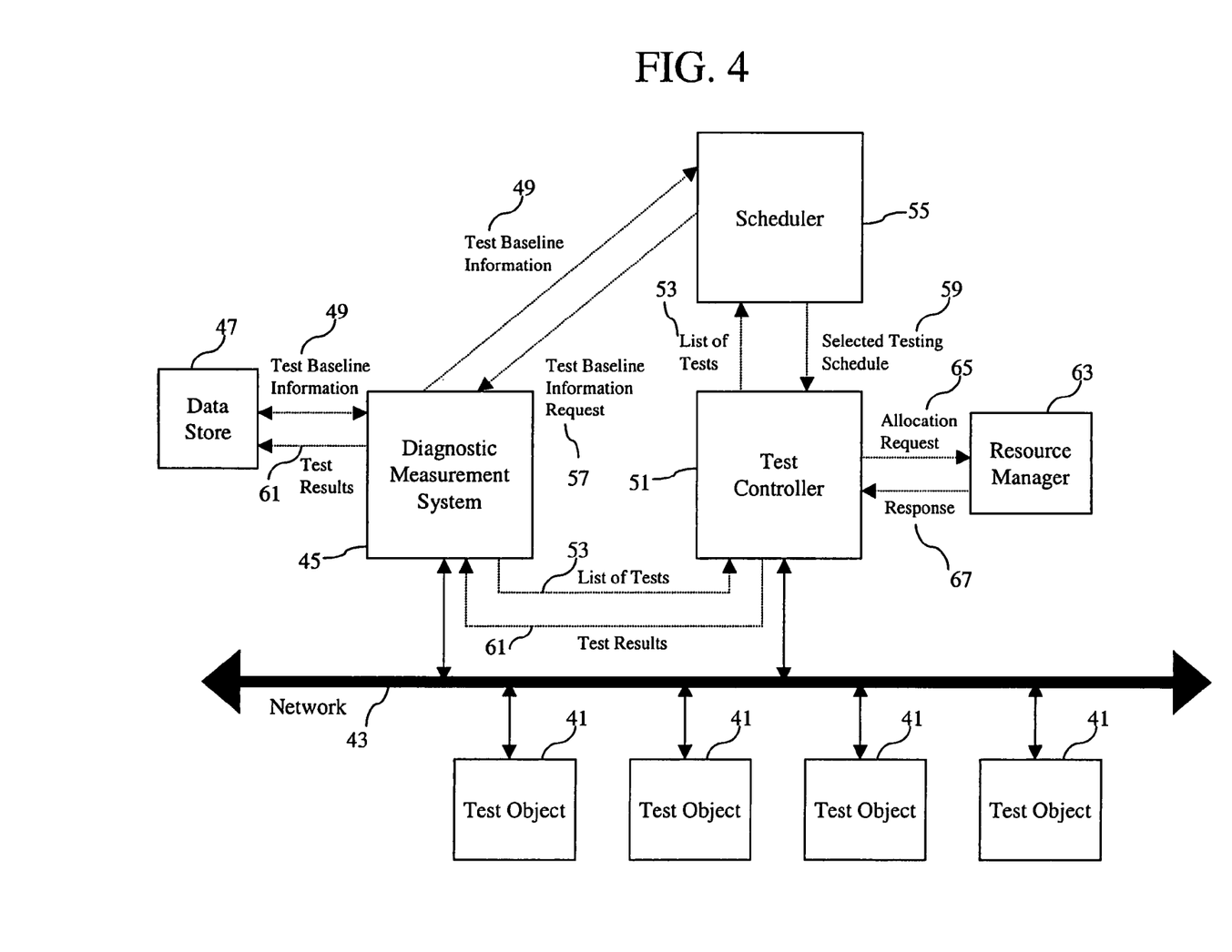
FIG. 4 illustrates an apparatus according to an embodiment of the present invention.

FIG. 4 illustrates an apparatus according to an embodiment of the present invention. In FIG. 4, test objects 41 are connected with a network 43. According to one embodiment, the network 43 is the internet, and the test objects 41 are elements of a wireless network. A diagnostic measurement system 45 is also connected with the network 43. A data store 47 stores test baseline information 49 for tests run on the test objects 41. According to one embodiment, the data store 47 is connected with the diagnostic measurement system 45. At a predetermined time prior to a testing interval, a test controller 51, which is also connected with the network 43, receives a list of tests 53 to be run during the testing interval from the diagnostic measurement system 45. According to one embodiment, the predetermined time prior to the testing interval is less than or equal to the testing interval. According to one embodiment, the testing interval is approximately 2-5 minutes. It will be appreciated that the testing interval can be lengthened or shortened according to testing needs. It will be appreciated that, according to one embodiment, communications depicted as being directly between various of the elements of FIG. 4, occur via the network 43.

The test controller 51 conveys the list of tests 53 to be run to a scheduler 55. After receiving the list of tests 53, the scheduler 55 requests 57 test baseline information for the tests to be run from the diagnostic measurement system 45. Coordinating with the data store 47 to retrieve available test baseline information 49, the diagnostic measurement system 45 conveys the available test baseline information 49 to the scheduler 55.

The scheduler then uses the list of tests 53, the available test baseline information 49, and a predetermined algorithm to automatically create a plurality of testing schedules. Each of the plurality of schedules indicates test object allocation for the testing interval. The predetermined algorithm creates the plurality of schedules under a condition in which a given test object cannot be simultaneously allocated to more than one test. The scheduler 55 is a computer, for example, a personal computer.

According to one embodiment, the scheduler 55 automatically creates the plurality of testing schedules using the predetermined algorithm, the list of the tests, and the available test baseline information by employing a genetic algorithm to combine a set of schedules to create a new generation of schedules, and introduce random mutations when creating the new generation of schedules. Further, according to one embodiment, the scheduler 55 selects the one of the plurality of schedules based on reducing an overlap of test object allocation for the testing interval by employing a Giffler-Thompson algorithm in conjunction with the new generation from the genetic algorithm, to evaluate and select a schedule from the new generation, based on reducing the overlap of test object allocation for the testing interval. The genetic algorithm generates schedules for all of tests at the same time.

The scheduler 55 then selects one of the plurality of schedules based on minimizing an overlap of test object allocation for the testing interval, and communicates the selected testing schedule 59 to the test controller 51. In other words, the selected testing schedule 59 includes a time at which each test needs to be started to minimize the possibility of an overlap in resource requirements that causes tests to wait for the resources they need.

The design and properties of specific types of genetic algorithms (computer program based on the genetic algorithm) are a function of the size of wireless network under test, the types of tests being run, and demands on the genetic algorithm in terms of an amount of improvement needed and the time in which the algorithm must produce a solution. For example, the algorithm must produce a solution prior to commencement of the testing interval.

Thus, the apparatus can be tuned in multiple ways by changing the way the basic operations (selection, recombination, and mutation) of the genetic algorithm work, and by changing certain other constants used by the algorithm. This allows the apparatus to be tuned depending on size of deployment and requirements specific to each network testing system. Conventional testing systems do not provide such flexibility.

After receiving the selected testing schedule 59, the test controller 51 runs the tests on the test objects 41 according to the selected schedule. Put differently, the test controller 51 runs a given test, or portion of the given test on all test objects 41 required by the given test. It is assumed that each test object 41 required by a given test has the resources needed to run the given test or portion thereof.

As long as the tests run close to the amount of time predicted for them using the baseline information 49, most of the tests would not have to wait for the test objects 41 they need, since the test objects 41 generally would be free by the time the test controller runs a given test. Once testing is complete, the test controller 51 reports test results 61 to the diagnostic measurement system 45, and the diagnostic measurement system 45 updates the data store 47 with the test results 61. Included in the test results is the actual run time of the test. Updating the test baseline information 49 with actual run times improves the accuracy of time prediction for future runs of the tests. In other words, the accuracy of the test baseline information 49 improves as more test data is collected, and thus the performance of the system will improve over time.

As noted previously, a given test object is idle if a test yet to be run requires both the given test object and another test object currently in use. According to one embodiment, minimizing the overlap of test object allocation for the testing interval includes minimizing intervals in which test objects are idle. According to another embodiment, minimizing the overlap of test object allocation for the testing interval includes maximizing usage of the test objects during the testing interval.

According to one embodiment, as is shown in FIG. 4, a resource manager 63 governs allocation of the test objects 41 for testing. Prior to running each test, the test controller 51 submits a request 65 to the resource manager 63 to allocate the test objects 41 required to run the test, and the resource manager responds 67. As noted previously, if all tests run close to the amount of time they are predicted to run, then when the test controller 51 requests test object allocation 65 from the resource manager 63, generally, the resource manager 63 immediately grants the request. That is, the selected testing schedule 59, created using the test baseline information 49 will avoid test object conflicts (tests waiting because the needed test object(s) are not yet free) most of the time. But if the test controller 51 requests a given test object 41 that is not yet available, the resource manager 63 will not immediately allocate the test object 41 for the test. In such a case, according to one embodiment, an elapsed time waiting for allocation is included in the test results 61.

According to one embodiment, if, according to the selected testing schedule 59, all of the test in the list of tests 53 will not be completed during the testing interval, the test controller 51 automatically notifies the diagnostic measurement system 45. According to one embodiment, such notification occurs prior to commencement of the schedule. That is, if too many tests are required to run, and running all of them would cause testing to run over the testing interval, the embodiment provides an early warning before the testing schedule is started. This will provide prior warning before a resource overuse occurs in the test system. Further, according to one embodiment, the test controller 51 will only runs those tests that, according to the selected schedule, will complete during the testing interval.

According to one embodiment, in addition to the test results 53, the test controller 51 conveys the selected testing schedule 59 to the diagnostic measurement system 45. Then, when the diagnostic measurement system 45 next supplies a list of tests to be run 53 to the test controller 51, the diagnostic measurement system 45 also supplies the most recent selected testing schedule to the test controller 51, and the scheduler 55 uses the most recent selected testing schedule as a starting point to automatically create the plurality of schedules. The configuration in FIG. 4 is only an example configuration. The present invention, however, is not limited to this specific configuration, and many variations are possible.

Figure 5:
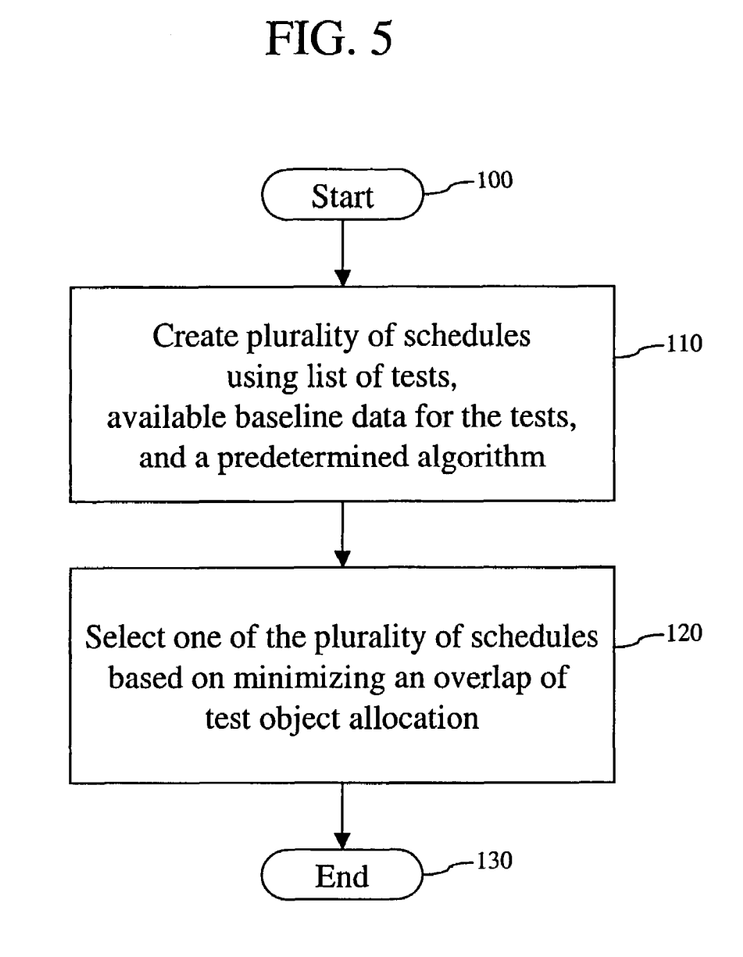
FIG. 5 illustrates a method according to an embodiment of the present invention.

FIG. 5 illustrates a method according to an embodiment of the present invention. The method illustrated in FIG. 5 can be implemented on a system such as the system illustrated in FIG. 4. In FIG. 5, the method is started 100, and in operation 110, a plurality of schedules of tests to be run on a network test system during a testing interval are automatically created using a predetermined algorithm, a list of the tests to be run during the testing interval, and available test baseline information for the tests. Each of the plurality of schedules indicates test object allocation for the testing interval, and a given test object cannot be simultaneously allocated to more than one test. Then, in operation 120, one of the plurality of schedules is automatically selected based on minimizing an overlap of test object allocation for the testing interval, and the method is completed 130.

According to one embodiment, the test objects are elements of a wireless network.

According to one embodiment, the method also includes running each test on test objects required for the test in accordance with the selected schedule, and using test results to update the test baseline information for each test. According to one embodiment, running each test on the test objects required for the test includes requesting allocation of the test objects required for the test from a resource manager, receiving the allocation, and running the test using the test objects required for the test. According to one embodiment, if the resource manager does not immediately allocate the required test objects to run the test, an elapsed time waiting for allocation is included in the test results.

According to one embodiment, automatically creating the plurality of schedules includes randomly creating a set of schedules, selecting a subset of schedules from the set, based on minimizing the overlap of test object allocation for the testing interval, combining the subset of schedules to create a new generation of schedules, introducing random mutations when creating the new generation of schedules, and repeating the selecting, combining, and introducing operations a predetermined number of times.

According to one embodiment, automatically creating the plurality of schedules using the predetermined algorithm, the list of the tests, and the available test baseline information includes employing a genetic algorithm to combine a set of schedules to create a new generation of schedules, and introduce random mutations when creating the new generation of schedules. According to one embodiment, automatically selecting the one of the plurality of schedules based on reducing the overlap of test object allocation for the testing interval includes employing a Giffler-Thompson algorithm in conjunction with the new generation from the genetic algorithm, to evaluate and select a subset of schedules from the new generation, based on reducing the overlap of test object allocation for the testing interval.

According to one embodiment, if the list of tests will not be completed during the testing interval, according to the selected testing schedule, the method includes automatically notifying a diagnostic measurement system. Further, such notification occurs prior to commencement of the selected schedule, and the only test that are run are those that will complete during the testing interval, according to the selected schedule.

According to one embodiment, the method additionally includes supplying a previously selected schedule as a starting point for automatically creating the plurality of schedules.

The described embodiments of the present invention provides a method and an apparatus to obtain reasonably good results in a reasonably short time (for example, approximately 2-5 minutes) between the extremes of a random un-optimized schedule and trying to find a formula that gives a 'perfect' solution. Further, as more iterations of testing intervals proceed, the described embodiments provide scheduling solutions approaching such a 'perfect', or 'minimized' solution. Thus, in this application, reducing or minimizing means approaching an ideal minimized solution. For example, reducing an overlap of test object allocation for the testing interval means approaching an ideal minimized overlap of test object allocation for the testing interval. Further, in this application, increasing or maximizing, means approaching an ideal maximized solution. For example, increasing usage of test objects during the testing interval means approaching an ideal maximized usage of test objects during the testing interval.

Various algorithms are described herein, such as the Giffler-Thompson algorithm. The present invention in not limited to this algorithm, and other algorithms can be used. Similarly, various networks are described herein, such as the internet. The present invention in not limited to the internet, and other networks can be used. Further, various systems under test are described herein, such as a wireless network. The present invention in not limited to wireless networks, and other networks can be used. Further, various network test systems are described herein, such as a wireless network test system. The present invention in not limited to wireless network test systems, and other network test systems can be used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method comprising:
   automatically creating a plurality of schedules of tests to be run on a network test system during a testing interval, using
   a predetermined algorithm,
   a list of the tests to be run during the testing interval, and
   available baseline data for the tests; and
   automatically selecting one of the plurality of schedules based on reducing an overlap of test object allocation for the testing interval,
   wherein the schedules indicate test object allocation for the testing interval, and a given test object cannot be simultaneously allocated to more than one test.

2. The method according to claim 1, wherein reducing the overlap of test object allocation for the testing interval comprises:
   reducing intervals in which test objects are idle,
   wherein a given test object is idle if a test yet to be run requires both the given test object and another test object currently in use.

3. The method according to claim 1, wherein reducing the overlap of test object allocation for the testing interval comprises:
   increasing usage of test objects during the testing interval.

4. The method according to claim 1, further comprising:
   according to the selected schedule, running each test on test objects required for the test; and
   using test results to update the baseline data for each test.

5. The method according to claim 1, further comprising:
   at a predetermined time prior to a testing interval, providing a list of the tests to be run; and
   providing available baseline data for the tests.

6. The method according to claim 4, wherein the running each test on the test objects required for the test comprises:
   requesting allocation of the test objects required for the test from a resource manager;
   receiving the allocation; and
   running the test using the test objects required for the test.

7. The method according to claim 1, wherein the automatically creating the plurality of schedules using the predetermined algorithm, the list of the tests, and the available test baseline information comprises:
   randomly creating a set of schedules;
   selecting a subset of schedules from the set, based on reducing the overlap of test object allocation for the testing interval;
   combining the subset of schedules to create a new generation of schedules;

introducing random mutations when creating the new generation of schedules; and repeating the selecting, combining, and introducing operations a predetermined number of times.

8. The method according to claim 1, wherein the automatically creating the plurality of schedules using the predetermined algorithm, the list of the tests, and the available test baseline information comprises:

employing a genetic algorithm to combine a set of schedules to create a new generation of schedules, and introduce random mutations when creating the new generation of schedules.

9. The method according to claim 8, wherein the automatically selecting the one of the plurality of schedules based on reducing the overlap of test object allocation for the testing interval comprises:

employing a Giffler-Thompson algorithm in conjunction with the new generation from the genetic algorithm, to evaluate and select a subset of schedules from the new generation, based on reducing the overlap of test object allocation for the testing interval.

10. The method according to claim 1, wherein the test objects are elements of a wireless network.

11. The method according to claim 6, wherein if the resource manager does not immediately allocate the required test objects to run the test, an elapsed time waiting for allocation is accounted for in determining an actual test duration, so that the updated baseline data reflects the actual test duration.

12. The method according to claim 1, further comprising:

if, according to the selected schedule, the list of tests will not be completed during the testing interval, automatically notifying a diagnostic measurement system.

13. The method according to claim 12, wherein:

if the list of tests will not be completed during the testing interval, the diagnostic measurement system is automatically notified prior to commencement of the selected schedule; and only those tests that, according to the selected schedule, will complete during the testing interval are run.

14. The method according to claim 5, wherein the predetermined time prior to the testing interval is less than or equal to the testing interval.

15. The method according to claim 1, further comprising:

supplying a previously selected schedule as a starting point for automatically creating the plurality of schedules.

16. An apparatus, comprising:

a scheduler connected with a network test system, receiving a list of tests to be run on the network test system during a testing interval, receiving available test baseline information for the tests to be run, using a predetermined algorithm, the list of the tests, and the available test baseline information, automatically creating a plurality of testing schedules, and selecting one of the plurality of schedules based on reducing an overlap of test object allocation for the testing interval, wherein the schedules indicate test object allocation for the testing interval, and a given test object cannot be simultaneously allocated to more than one test.

17. The apparatus according to claim 16, wherein reducing the overlap of test object allocation for the testing interval comprises:

reducing intervals in which test objects are idle, wherein a given test object is idle if a test yet to be run requires both the given test object and another test object currently in use.

18. The apparatus according to claim 16, wherein reducing the overlap of test object allocation for the testing interval comprises:

increasing usage of test objects during the testing interval.

19. The apparatus according to claim 16, wherein the test objects are elements of a wireless network.

20. The apparatus according to claim 16, wherein the automatically creating the plurality of testing schedules using the predetermined algorithm, the list of the tests, and the available test baseline information comprises:

employing a genetic algorithm to combine a set of schedules to create a new generation of schedules, and introduce random mutations when creating the new generation of schedules.

21. The apparatus according to claim 20, wherein the selecting the one of the plurality of schedules based on reducing an overlap of test object allocation for the testing interval comprises:

employing a Giffler-Thompson algorithm in conjunction with the new generation from the genetic algorithm, to evaluate and select a schedule from the new generation, based on reducing the overlap of test object allocation for the testing interval.

22. The apparatus according to claim 16, wherein said scheduler comprises a computer.

23. An apparatus, comprising:

a network;

test objects connected with the network;

a data store storing test baseline information for tests run on the test objects;

a diagnostic measurement system connected with the network;

a test controller, connected with the network and receiving, from the diagnostic measurement system, at a predetermined time prior to a testing interval, a list of tests to be run during the testing interval; and a scheduler, receiving the list of tests to be run from the test controller, requesting the test baseline information for the tests to be run from the diagnostic measurement system, the diagnostic measurement system coordinating with the data store to retrieve available test baseline information, receiving the available test baseline information for the tests to be run, using a predetermined algorithm, the list of tests, and the available test baseline information, automatically creating a plurality of testing schedules, selecting one of the plurality of schedules based on reducing an overlap of test object allocation for the testing interval, and communicating the selected schedule to the test controller, wherein the schedules indicate the test object allocation for the testing interval, a given test object cannot be simultaneously allocated to more than one test, after receiving the selected schedule, the test controller runs the tests on the test objects according to the selected schedule, and once testing is complete, the test controller reports test results to the diagnostic measurement system, and the diagnostic measurement system updates the data store with the test results.

24. The apparatus according to claim 23, wherein reducing the overlap of test object allocation for the testing interval comprises:
reducing intervals in which test objects are idle,
wherein a given test object is idle if a test yet to be run requires both the given test object and another test object currently in use.

25. The apparatus according to claim 23, wherein reducing the overlap of test object allocation for the testing interval comprises:
increasing usage of test objects during the testing interval.

26. The apparatus according to claim 23, further comprising:
a resource manager governing allocation of the test objects for testing,
wherein prior to running each test, the test controller submits a request to the resource manager to allocate the test objects required to run the test, and the resource manager responds.

27. The apparatus according to claim 26, wherein if the resource manager does not immediately allocate the required test objects to run the test, an elapsed time waiting for allocation is accounted for in determining an actual test duration, so that the updated baseline data reflects the actual test duration.

28. The apparatus according to claim 23, wherein the network is the internet, and the test objects are elements of a wireless network.

29. The apparatus according to claim 23, wherein the automatically creating the plurality of testing schedules using the predetermined algorithm, the list of the tests, and the available test baseline information comprises:
employing a genetic algorithm to combine a set of schedules to create a new generation of schedules, and introduce random mutations when creating the new generation of schedules.

30. The apparatus according to claim 29, wherein the selecting the one of the plurality of schedules based on reducing an overlap of test object allocation for the testing interval comprises:
employing a Giffler-Thompson algorithm in conjunction with the new generation from the genetic algorithm, to evaluate and select a schedule from the new generation, based on reducing the overlap of test object allocation for the testing interval.

31. The apparatus according to claim 23, wherein if, according to the selected schedule, the list of tests will not be completed during the testing interval, the test controller automatically notifies the diagnostic measurement system.

32. The apparatus according to claim 31, wherein:
if the list of tests will not be completed during the testing interval, the test controller automatically notifies the diagnostic measurement system prior to commencement of the schedule; and
the test controller only runs those tests that, according to the selected schedule, will complete during the testing interval.

33. The apparatus according to claim 23, wherein the predetermined time prior to the testing interval is less than or equal to the testing interval.

34. The apparatus according to claim 23, wherein:
the diagnostic measurement system supplies the scheduler with a previously selected schedule; and
the scheduler uses the previously selected schedule as a starting point to automatically create the plurality of schedules.

* * * * *